(12) United States Patent  (10) Patent No.: US 7,672,024 B2
Kuan  (45) Date of Patent: Mar. 2, 2010

(54) CONTACT IMAGE SENSOR MODULE

(76) Inventor: Chien-Kuo Kuan, No. 669, Ruey Kuang Road, Neihu, Taipei (TW)

( * ) Notice: Subject to any disclaimer, the term of this patent is extended or adjusted under 35 U.S.C. 154(b) by 855 days.

(21) Appl. No.: 11/232,938

(22) Filed: Sep. 23, 2005

(65) Prior Publication Data

US 2007/0035785 A1  Feb. 15, 2007

(30) Foreign Application Priority Data

Aug. 9, 2005  (TW) .............................. 94126985 A

(51) Int. Cl.
  *H04N 1/04* (2006.01)
(52) U.S. Cl. ................ 358/482; 358/483; 358/496; 358/497; 358/474; 358/488; 358/486
(58) Field of Classification Search ................ 358/483, 358/482, 474, 494, 497, 496, 487, 506, 472; 358/473, 512–514, 505, 488, 486; 250/208.1, 250/216, 234–236; 382/312, 313, 318, 319; 355/40, 41; 399/211, 212; 356/635, 636
See application file for complete search history.

(56) References Cited

U.S. PATENT DOCUMENTS

| 5,036,397 | A | * | 7/1991 | Nagabusa | .................... 348/311 |
| 5,068,747 | A | * | 11/1991 | Nonoyama | .................... 358/448 |
| 5,640,251 | A | * | 6/1997 | Tone et al. | .................... 358/482 |
| 5,726,781 | A | * | 3/1998 | Isemura et al. | .............. 358/530 |
| 6,215,553 | B1 | * | 4/2001 | Rider et al. | ................. 356/630 |
| 6,496,286 | B1 | * | 12/2002 | Yamazaki | .................... 358/514 |
| 6,704,124 | B2 | * | 3/2004 | Hu et al. | ...................... 358/473 |
| 7,034,969 | B2 | * | 4/2006 | Watanabe | .................... 358/513 |
| 7,068,402 | B2 | * | 6/2006 | Witte et al. | ................. 358/509 |
| 2007/0002408 | A1 | * | 1/2007 | Ikeno | ......................... 358/514 |
| 2007/0002409 | A1 | * | 1/2007 | Oguri et al. | ................. 358/514 |
| 2007/0206235 | A1 | * | 9/2007 | Ikeno | ......................... 358/474 |

FOREIGN PATENT DOCUMENTS

| CN | 1885897 | 12/2006 |
| TW | 278687 | 6/1996 |
| TW | 496073 | 7/2002 |
| TW | 094126985 | 5/2008 |
| TW | 094126985 | 4/2009 |

OTHER PUBLICATIONS

Foreign Office Action from Taiwanese patent application No. 09412698.5 mailed on Oct. 12, 2009.

* cited by examiner

*Primary Examiner*—Cheukfan Lee
(74) *Attorney, Agent, or Firm*—Workman Nydegger

(57) ABSTRACT

A contact image sensor module for scanning a document includes a light source, a photosensing array and a lens assembly. The light source emits a light beam to the document, thereby generating an optical signal. The photosensing array is used for converting the optical signal into an electronic signal. The lens assembly is used for focusing the optical signal reflected from the document and imaging the optical signal onto the photosensing array. The photosensing array includes a first photosensing element with a first width and a second photosensing element with a second width. The first width is greater than the second width.

16 Claims, 4 Drawing Sheets

CONTACT IMAGE SENSOR MODULE

FIELD OF THE INVENTION

The present invention relates to an image sensor module, and more particularly to a contact image sensor (CIS) module.

BACKGROUND OF THE INVENTION

In an electronic apparatus with a scanning function, a contact image sensor module is widely used to scan graphs or texts. The scanned graphs or texts are converted into electronic signals for further processing operations such as transmission, display or storage. Referring to FIG. 1, a contact image sensor module 1 comprises a light source 11, a lens assembly 12 and a photosensing array 14 mounted on a substrate 13. During operation, the light beam emitted from the light source 11 is projected onto a document 15 to be scanned. The light beam reflected from the scanned document 15 is focused by the lens assembly 12. The focused light beam is then imaged onto the photosensing array 14. By means of the photosensing array 14, the optical signals indicative of colorful or grey scale changes for each scan line are successively converted into electronic signals, which are then processed into an image frame.

Please refer to FIG. 1 again. Since the photosensing array 14 comprises a linear array of discontinuous photosensing elements 14B of the same size, a gap P is present between two adjacent photosensing elements 14B. After the light beam reflected from the scanned document 15 and focused by the lens assembly 12, the photosensing array 14 fails to receive the optical signals completely and continuously. Therefore, an alternately dark and bright image, a discontinuous image or even a blank image occurs.

SUMMARY OF THE INVENTION

As previously described, the gaps between two adjacent photosensing elements in a photosensing array leads to the discontinuous image frames.

It is a document of the present invention to provide a photosensing array and a contact image sensor module having this photosensing array, in which the number of gaps present in the photosensing array is reduced, so as to minimize the discontinuous image frames of the scanned document of a regular size.

It is another document of the present invention to provide a contact image sensor module to scan the small-sized documents such as photographs, films or certificates, thereby avoiding the problem of generating discontinuous image frames.

The above documents are achieved by providing a photosensing array and a contact image sensor module having this photosensing array according to the present invention.

In accordance with a first aspect of the present invention, there is provided a contact image sensor module for scanning a document. The contact image sensor module comprises a light source, a photosensing array and a lens assembly. The light source emits a light beam to the document, thereby generating an optical signal. The photosensing array is used for converting the optical signal into an electronic signal. The lens assembly is used for focusing the optical signal reflected from the document and imaging the optical signal onto the photosensing array. The photosensing array comprises a first photosensing element with a first width and a second photosensing element with a second width. The first width is greater than the second width.

In an embodiment, the first width of the first photosensing element is greater than the shorter side's width of the document.

Preferably, the document is a film.

Preferably, the document is a photograph.

In an embodiment, the first photosensing element is arranged in the middle portion of the photosensing array.

In accordance with a second aspect of the present invention, there is provided a photosensing array of a contact image sensor module for receiving an optical signal from a lens assembly. The photosensing array comprises a first photosensing element with a first width and a second photosensing element with a second width, wherein the first width is greater than the second width.

In an embodiment, the first photosensing element and the second photosensing element are arranged in a line, and the first photosensing element is arranged in the middle portion of the photosensing array.

In an embodiment, the first width of the first photosensing element is greater than the shorter side's width of a film.

The above documents and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
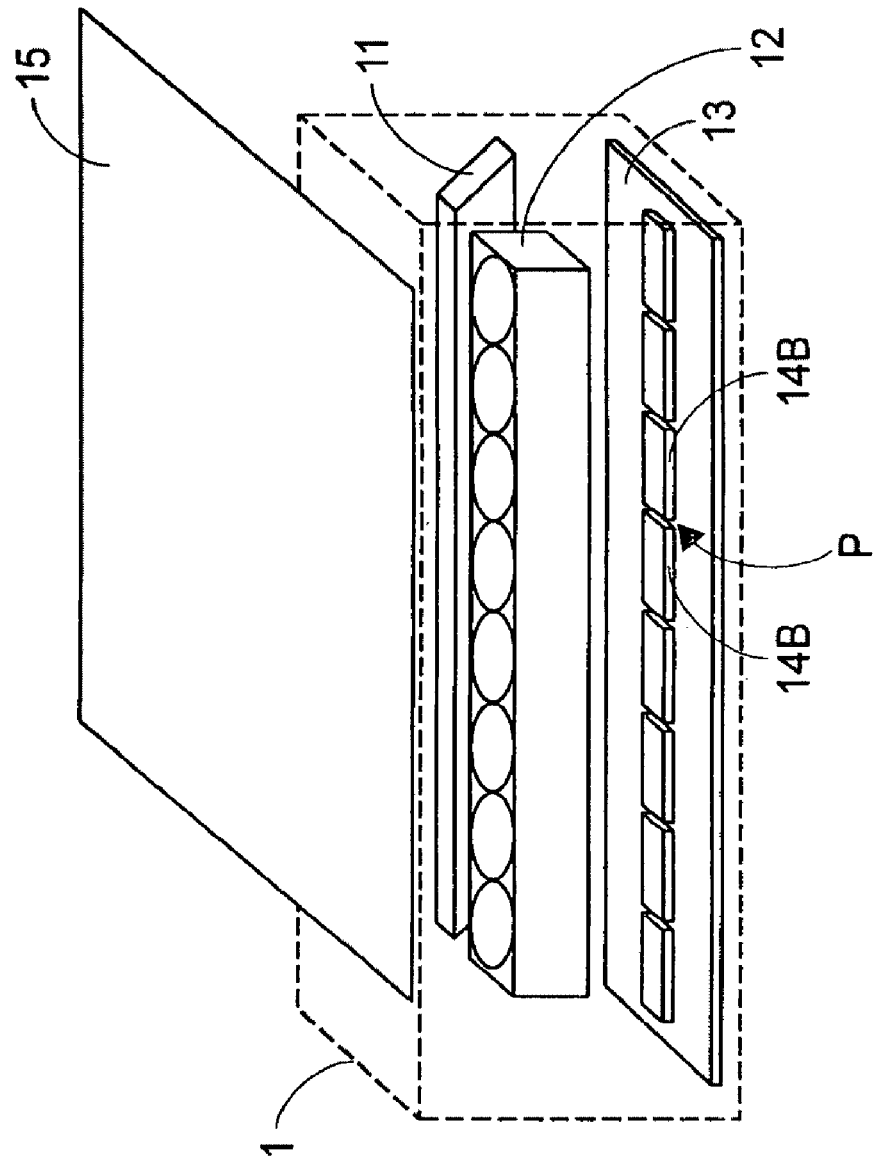
FIG. 1 is a schematic perspective view illustrating a contact image sensor module according to prior art.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extensive to include multiple elements or structures.

Figure 2:
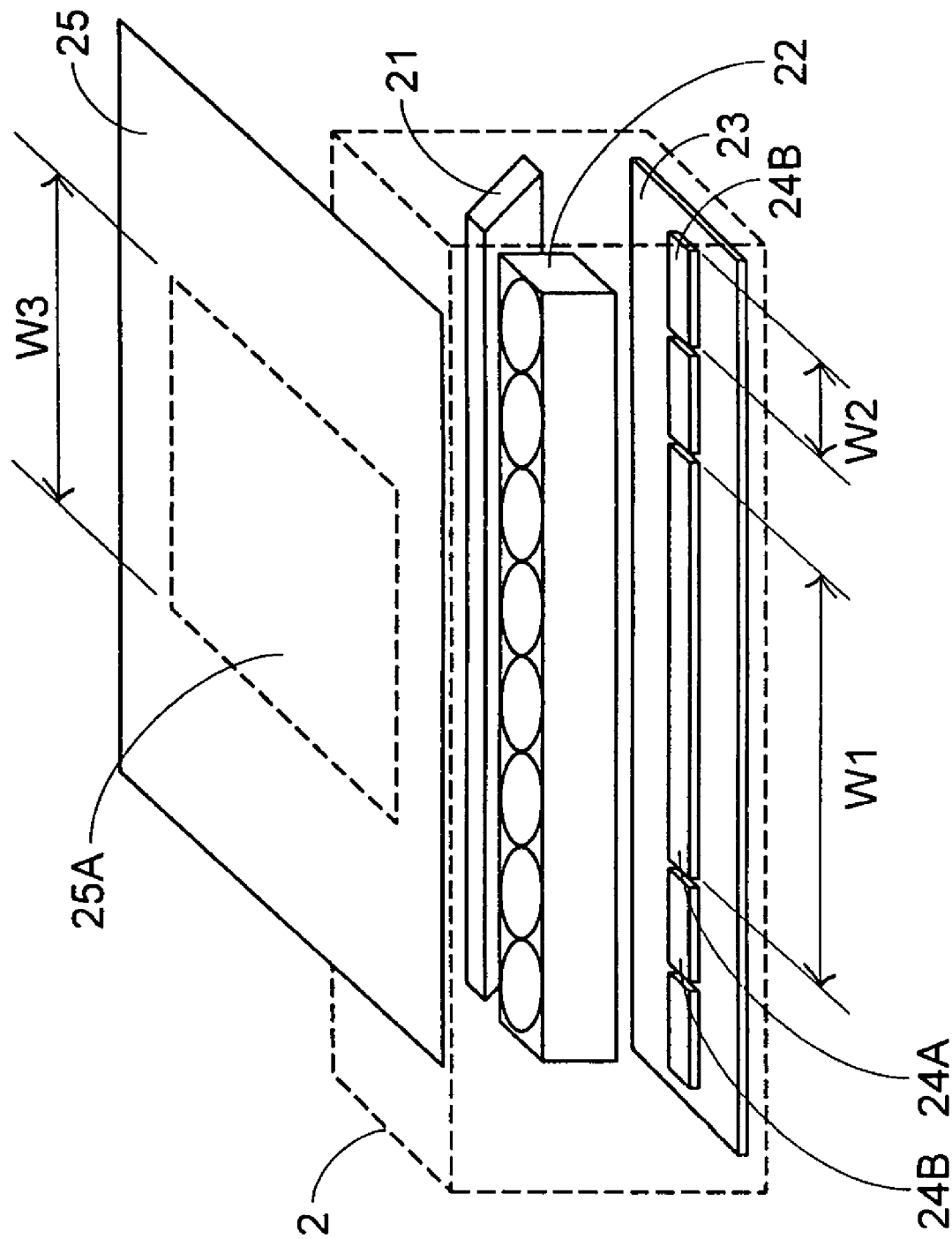
FIG. 2 is a schematic perspective view illustrating a contact image sensor module according to a first embodiment of the present invention.

Referring to FIG. 2, a schematic view of a contact image sensor module according to a preferred embodiment of the present invention is shown. The contact image sensor module 2 of FIG. 2 comprises a light source 21, a lens assembly 22 and a photosensing array 24 mounted on a substrate 23. The light source 21 is a light emitting diode (LED) array. The lens assembly 22 comprises several radial gradient index lenses arranged in a line. During operation, the light emitted from the light source 21 is projected onto a document 25 to be scanned. The light beam reflected from the scanned document 25 is focused by the lens assembly 22. The focused light beam is then imaged onto the photosensing array 24. By means of the photosensing array 24, the optical signals indicative of colorful or grey scale changes for each scan line are successively converted into electronic signals, which are then processed into an image frame.

Please refer to FIG. 2 again. The photosensing array 24 comprises at least a first photosensing element 24A with a first width W1 and a second photosensing element 24B with a second width W2. The first width W1 of the first photosensing element 24A is greater than the second width W2 of the second photosensing element 24B. The first photosensing element 24A is arranged in the middle portion of the photosensing array 24. When a document of a regular size, for example A4 or B5 size, is intended to be scanned, the optical signals from the lens assembly 22 is received by the photosensing array 24. Since the number of gaps (e.g the gaps between the photosensing element 24A and the adjacent photosensing element 24B, or the gaps between two adjacent photosensing elements 24B) present in the photosensing array 24 is reduced, the problem of generating a discontinuous image frame is minimized. On the other hand, in a case that a small-sized document 25A such as a photograph, a film, a certificate or a bill is scanned, the width of the small-sized document 25A is preferably shorter than the first width W1 of the first photosensing element 24A. This special design facilitates complete elimination of discontinuous image frames.

The dimension of a common positive or negative is shown is Table 1.

TABLE 1

| Type of document to be scanned | | Dimension | Shorter side's width |
|---|---|---|---|
| Film | 135 camera | 24 (mm) × 36 (mm) | 24 (mm) |
| | 4 × 5 | 4.5 (inch) × 5 (inch) | 4.5 (inch) |
| | large-sized camera | 5 (inch) × 7 (inch) | 5 (inch) |
| | | 8 (inch) × 10 (inch) | 8 (inch) |
| | 120 medium-sized camera | 6 (mm) × 4.5 (mm) | 4.5 (mm) |
| | | 6 (mm) × 6 (mm) | 6 (mm) |
| | | 6 (mm) × 7 (mm) | 6 (mm) |
| | | 6 (mm) × 9 (mm) | 6 (mm) |
| | | 6 (mm) × 17 (mm) | 6 (mm) |
| | 110 pocket-size camera | 13 (mm) × 17 (mm) | 13 (mm) |

The contact image sensor module 2 of the present invention is applied to the electronic apparatuses with scanning functions, for example image scanners, film scanners, facsimile machines or multifunction peripherals.

Figure 3:
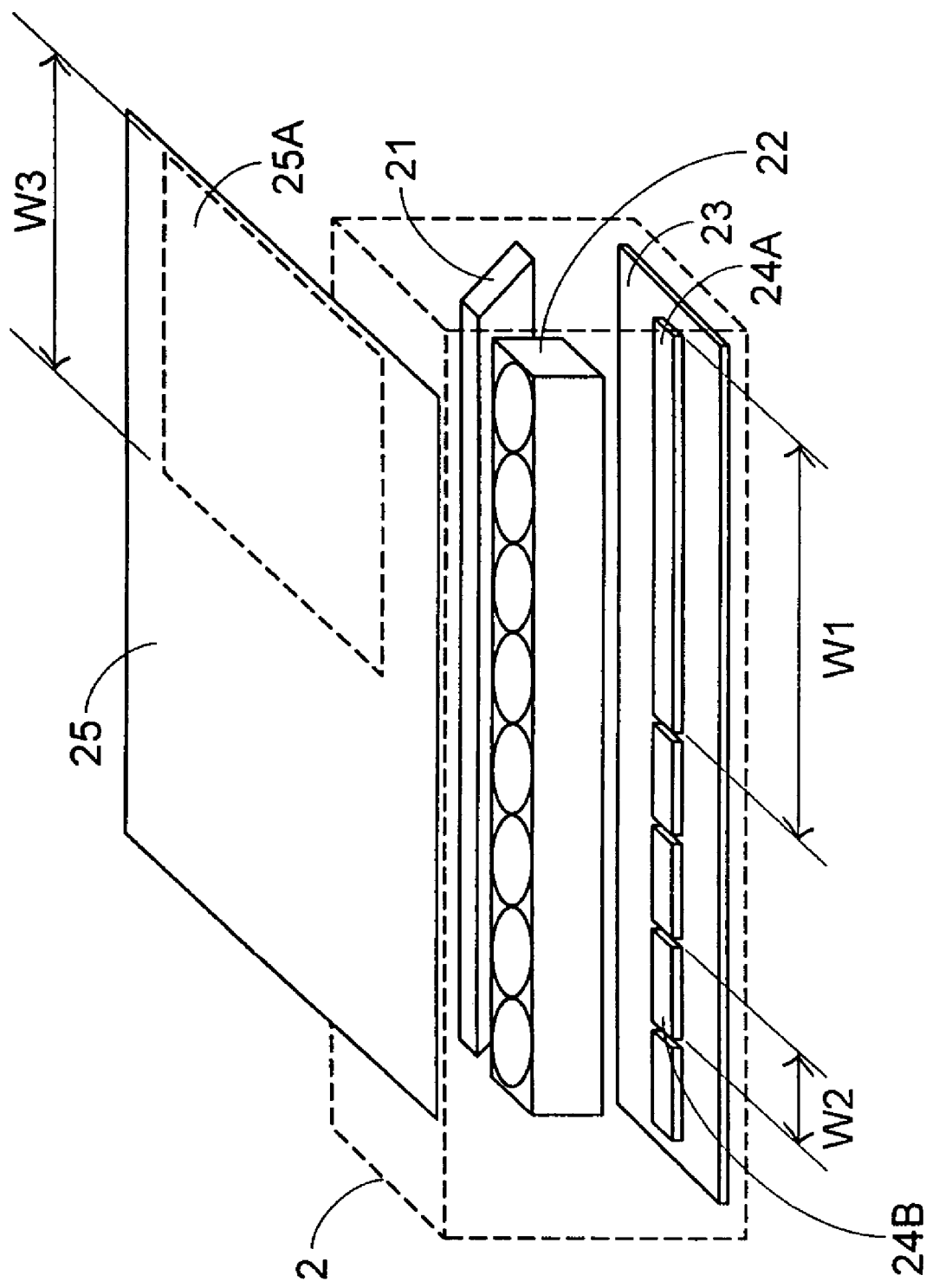
FIG. 3 is a schematic perspective view illustrating a contact image sensor module according to a second embodiment of the present invention.

In the first embodiment, the first photosensing element 24A is arranged in the middle portion of the photosensing array 24. Otherwise, depending on the design of the paper feeding mechanism or the slide mount holder, the location of the first photosensing element 24A may be varied. Referring to FIG. 3, a contact image sensor module according to a second embodiment of the present invention is shown. The first photosensing element 24A is arranged at the initial or terminal side of the photosensing array 24. Likewise, the width of the small-sized document 25A is shorter than the first width W1 of the first photosensing element 24A.

Figure 4:
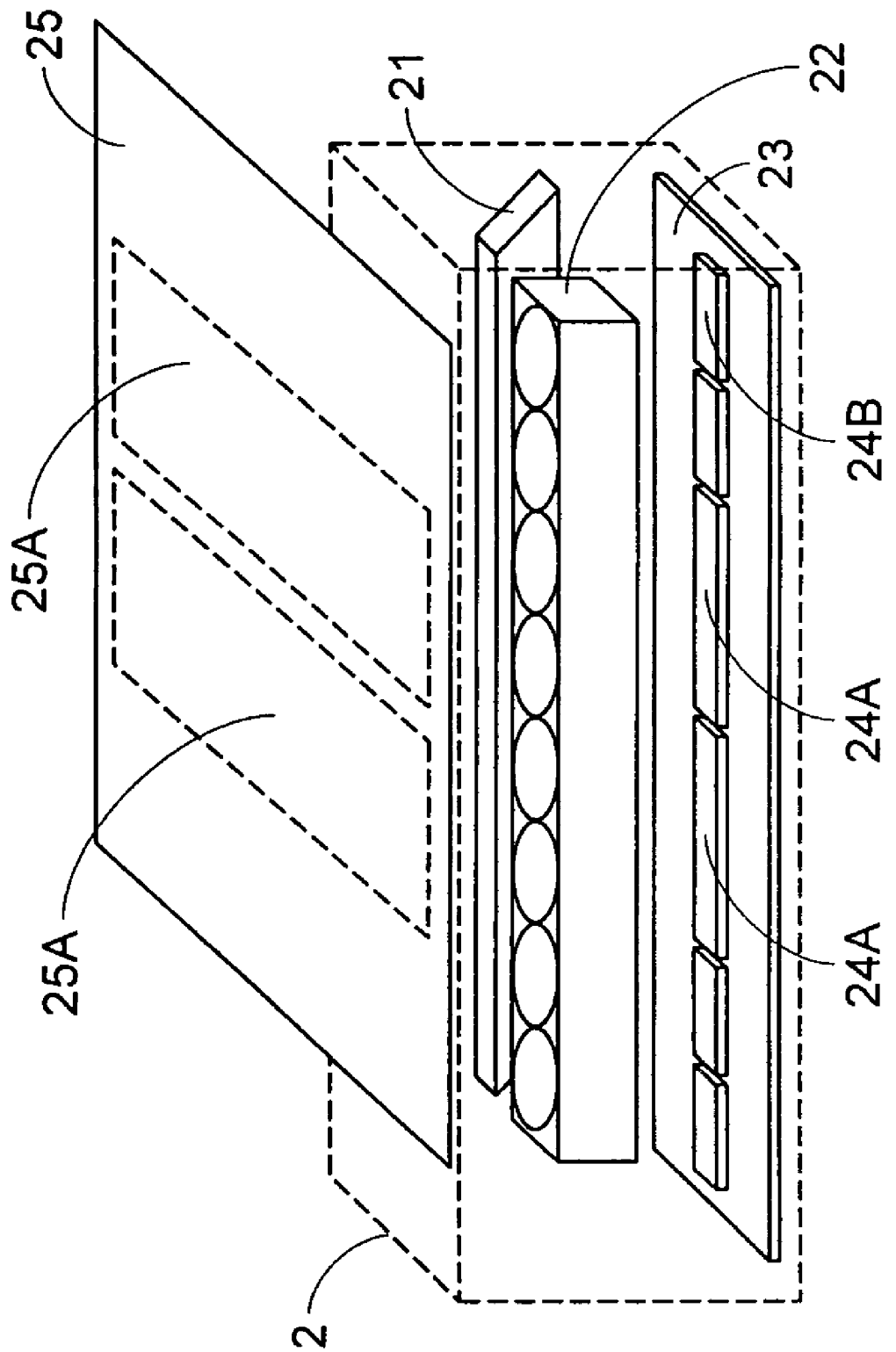
FIG. 4 is a schematic perspective view illustrating a contact image sensor module according to a three embodiment of the present invention.

Furthermore, in a case that the paper feeding mechanism or the slide mount holder is able to carry or input several small-sized documents in parallel arrangement, the photosensing array 24 may comprises identical number of photosensing elements with longer widths. Referring to FIG. 4, a contact image sensor module according to a third embodiment of the present invention is shown. If two small-sized documents 25A are intended to be scanned, the photosensing array 24 may include two longer-width photosensing elements 24A in the locations corresponding to the small-sized documents 25A, thereby receiving the optical signals from the lens assembly 22. This special design facilitates complete elimination of the discontinuous image frames.

From the above description, the number of gaps present in the photosensing array is reduced when at least two kinds of photosensing elements with different widths are arranged in a line. Since the longer-width photosensing element is wider than the small-sized document and disposed under the small-sized document, the problem of generating discontinuous image frames is minimized in the identical scanning conditions. Examples of the photosensing elements include silicon chips. As the width of the silicon chip is increased, the gap number would be reduced, but the fabricating cost thereof is increased. When the cost and the benefit are taken into consideration, the photosensing array of the present invention is satisfied because the gap number and the fabricating cost are reasonably reduced. It is noted that, however, those skilled in the art will readily observe that numerous modifications and alterations of the photosensing array may be made while retaining the teachings of the invention. Accordingly, the above disclosure should be limited only by the bounds of the following claims.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A contact image sensor module for scanning a document, comprising:
    a light source for emitting a light beam to said document, thereby generating an optical signal;
    a photosensing array for converting said optical signal into an electrical signal processable into an image frame of the document; and
    a lens assembly for focusing said optical signal reflected from said document and imaging said optical signal onto said photosensing array;
    wherein said photosensing array comprises a first photosensing element with a first width and a second photosensing element with a second width, said first width is greater than said second width, and wherein said first and second photosensing elements are collinear.

2. The contact image sensor module according to claim 1 wherein said first photosensing element is arranged in the middle portion of said photosensing array.

3. A contact image sensor module for scanning a document, comprising:
    a light source for emitting a light beam to said document, thereby generating an optical signal;
    a photosensing away for convening said optical signal into an electrical signal; and
    a lens assembly for focusing said optical signal reflected from said document and imaging said optical signal onto said photosensing array, wherein said photosensing array comprises a first photosensing element with a first width and a second photosensing element with a second width, and said first width is greater than said second width;
    wherein said first width of said first photosensing element is greater than a shorter side's width of said document, and wherein each of the first and second photosensing elements comprises a silicon chip, and wherein the silicon chip of the first photosensing element is separated from the silicon chip of the second photosensing element by a gap.

4. The contact image sensor module according to claim 3 wherein said document is a film.

5. The contact image sensor module according to claim 3 wherein said document is a photograph.

6. The contact image sensor module according to claim 3 wherein said first photosensing element is arranged in the middle portion of said photosensing array.

7. A contact image sensor module for scanning a document, comprising:

a light source for emitting a light beam to the document to generate an optical signal;

a photosensing array that includes a plurality of photosensing elements, wherein at least one photosensing element in the plurality of photosensing elements has a different width than other photosensing elements in the plurality of photosensing elements; and a lens assembly that focuses the optical signal on the plurality of photosensing elements, wherein the plurality of photosensing elements generates electrical signals that are processed into image frames of the document;

wherein the at least one photosensing element is collinear with the other photosensing elements of the plurality of photosensing elements.

8. The contact image sensor module of claim 7, wherein the at least one photosensing element is adjacent to photosensing elements having a second width that is less than the width of the at least one photosensing element.

9. The contact image sensor module of claim 7, wherein the at least one photosensing element comprises two photosensing elements each having a width that is wider than a second width of the other photosensing elements.

10. The contact image sensor module of claim 9, wherein the width of each of the two photosensing elements is sufficient to scan a document without discontinuous image frames.

11. A contact image sensor module for scanning a document, comprising:

a light source for emitting a light beam to the document to generate an optical signal;

a photosensing array that includes a plurality of photosensing elements, wherein at least one photosensing element in the plurality of photosensing elements has a different width than other photosensing elements in the plurality of photosensing elements;

a lens assembly that focuses the optical signal on the plurality of photosensing elements, wherein the plurality of photosensing elements generates electrical signals that are processed into image frames of the document; and a paper feeding mechanism, wherein a location of the at least one photosensing element is selected according to a design of the paper feeding mechanism.

12. The contact image sensor module of claim 11, wherein the at least one photosensing element is placed such that a particular document is scanned by one of the at least one photosensing element without discontinuous image frames.

13. The contact image sensor module of claim 11, wherein the at least one photosensing element having a different width than the other photosensing elements in the plurality of photosensing elements is at a terminal side of the photosensing array.

14. The contact image sensor module of claim 11, wherein the at least one photosensing element is in a middle of the photosensing array.

15. The contact image sensor module of claim 11, wherein the at least one photosensing element is two photosensing elements, each of the two photosensing elements being positioned to process an optical signal from one of the two documents without generating discontinuous image frames of the document.

16. The contact image sensor module of claim 15, wherein the at least one photosensing element having a different width than the other photosensing elements in the plurality of photosensing elements comprises two photosensing elements, each having a width that is greater that the other photosensing elements in the photosensing array.

\* \* \* \* \*

UNITED STATES PATENT AND TRADEMARK OFFICE
CERTIFICATE OF CORRECTION

PATENT NO. : 7,672,024 B2 Page 1 of 1
APPLICATION NO. : 11/232938
DATED : March 2, 2010
INVENTOR(S) : Chien-Kuo Kuan It is certified that error appears in the above-identified patent and that said Letters Patent is hereby corrected as shown below:

Column 4
Line 55, change "away" to --array--

Column 6
Line 37, change "greater that" to --greater than--

Signed and Sealed this

Twenty-seventh Day of April, 2010

David J. Kappos
*Director of the United States Patent and Trademark Office*